(12) United States Patent
Durocher et al.

(10) Patent No.: US 7,909,569 B2
(45) Date of Patent: Mar. 22, 2011

(54) TURBINE SUPPORT CASE AND METHOD OF MANUFACTURING

(75) Inventors: Eric Durocher, Vercheres (CA); Martin Jutras, St. Amable (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 975 days.

(21) Appl. No.: 11/148,295

(22) Filed: Jun. 9, 2005

(65) Prior Publication Data

US 2006/0277922 A1 Dec. 14, 2006

(51) Int. Cl.
 *F01D 25/26* (2006.01)
(52) U.S. Cl. .................................. 415/108; 415/138
(58) Field of Classification Search .................. 415/134, 415/135, 138, 219 R, 116, 108, 189, 190, 415/185, 199.5, 211.2; 60/796, 805
See application file for complete search history.

(56) References Cited

U.S. PATENT DOCUMENTS

| | | | |
|---|---|---|---|
| 3,314,648 A | 4/1967 | Howald | |
| 3,403,889 A | 10/1968 | Ciokajlo | |
| 3,736,069 A * | 5/1973 | Beam et al. ................ | 415/115 |
| 3,759,038 A | 9/1973 | Scalzo et al. | |
| 3,867,060 A * | 2/1975 | Huber ...................... | 415/173.5 |
| 4,016,718 A | 4/1977 | Lauck | |
| 4,050,660 A | 9/1977 | Eggmann et al. | |
| 4,135,853 A | 1/1979 | Jansson et al. | |
| 4,251,185 A * | 2/1981 | Karstensen ................ | 415/136 |
| 4,255,082 A | 3/1981 | Goebel | |
| 4,438,956 A * | 3/1984 | Jones et al. ............... | 285/223 |
| 4,492,078 A | 1/1985 | Williamson | |
| 4,558,564 A * | 12/1985 | Bouiller et al. ............ | 60/792 |
| 4,720,240 A | 1/1988 | Bronowski et al. | |
| 4,796,423 A * | 1/1989 | Lievestro et al. .......... | 60/801 |
| 4,802,821 A * | 2/1989 | Krietmeier ................ | 415/208.2 |
| 4,834,613 A | 5/1989 | Hansen et al. | |
| 5,080,557 A * | 1/1992 | Berger ..................... | 415/173.3 |
| 5,112,190 A | 5/1992 | Kajiwara et al. | |
| 5,256,033 A | 10/1993 | Kajiwara | |
| 5,358,380 A | 10/1994 | Arakawa | |
| 5,403,148 A * | 4/1995 | Forrester ................... | 415/9 |
| 5,485,723 A | 1/1996 | McCoy et al. | |
| 6,164,903 A | 12/2000 | Kouris | |
| 6,463,992 B1 | 10/2002 | Dowhan et al. | |
| 6,484,511 B2 * | 11/2002 | Eppler et al. .............. | 60/796 |
| 6,506,018 B1 * | 1/2003 | Brennan ................... | 415/214.1 |
| 6,575,694 B1 | 6/2003 | Thompson et al. | |
| 7,334,981 B2 * | 2/2008 | Moniz et al. .............. | 415/65 |
| 2001/0025479 A1 * | 10/2001 | Eppler et al. .............. | 60/39.31 |
| 2002/0159886 A1 * | 10/2002 | Hiyama et al. ............ | 415/207 |
| 2003/0005705 A1 * | 1/2003 | Chan et al. ................ | 60/796 |
| 2003/0206798 A1 | 11/2003 | Allmang et al. | |
| 2003/0226362 A1 * | 12/2003 | Niday et al. ............... | 60/796 |

* cited by examiner

Primary Examiner — Michael Cuff
Assistant Examiner — Gerald L Sung
(74) Attorney, Agent, or Firm — Ogilvy Renault LLP

(57) ABSTRACT

The turbine support case comprises a first annular portion, a second annular portion, and a third annular portion connected between the first and the second portion. The third portion has an average wall thickness smaller than an average wall thickness of the first and the second portion.

12 Claims, 2 Drawing Sheets

TURBINE SUPPORT CASE AND METHOD OF MANUFACTURING

TECHNICAL FIELD

The field of invention relates generally to the design of gas turbine engine components and, more particularly, to an improved turbine support case and a method of manufacturing the same.

BACKGROUND OF THE ART

Turbine support cases are used in gas turbine engines to support most parts surrounding the turbine section and as a link between the front and the rear of an engine. Like for any other components of a gas turbine engine, there is a constant need to provide turbine support cases having the lowest possible manufacturing costs and also having a light weight, especially for a gas turbine engine to be mounted on an aircraft.

Accordingly, there is a need to provide an improved turbine support case, and a method of manufacturing the same, which will provide new opportunities to engineers in the design of gas turbine engines.

SUMMARY OF THE INVENTION

In one aspect, the present invention provides a turbine support case for use in a gas turbine engine, the support case comprising:
  a first annular portion;
  a second annular portion; and
  a third annular portion provided between the first portion and the second portion, the third portion having an average wall thickness smaller than an average wall thickness of the first portion or the second portion.

In another aspect, the present invention provides a turbine support case for use in a gas turbine engine, the support case comprising:
  a first annular portion having an average wall thickness of at least 70 mils;
  a second annular portion having an average wall thickness of at least 70 mils;
  a third annular portion having an average wall thickness being less than 70 mils; and
  means for coaxially connecting the third portion between the first portion and the second portion.

In another aspect, the present invention provides a method of manufacturing a turbine support case for use in a gas turbine engine, the method comprising:
  providing a first annular portion;
  providing a second annular portion;
  providing a third annular portion, the third portion having an average wall thickness smaller than an average wall thickness of the first portion and the second portion; and
  connecting the third portion between the first portion and the second portion.

Further details of these and other aspects of the present invention will be apparent from the detailed description and accompanying figures.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
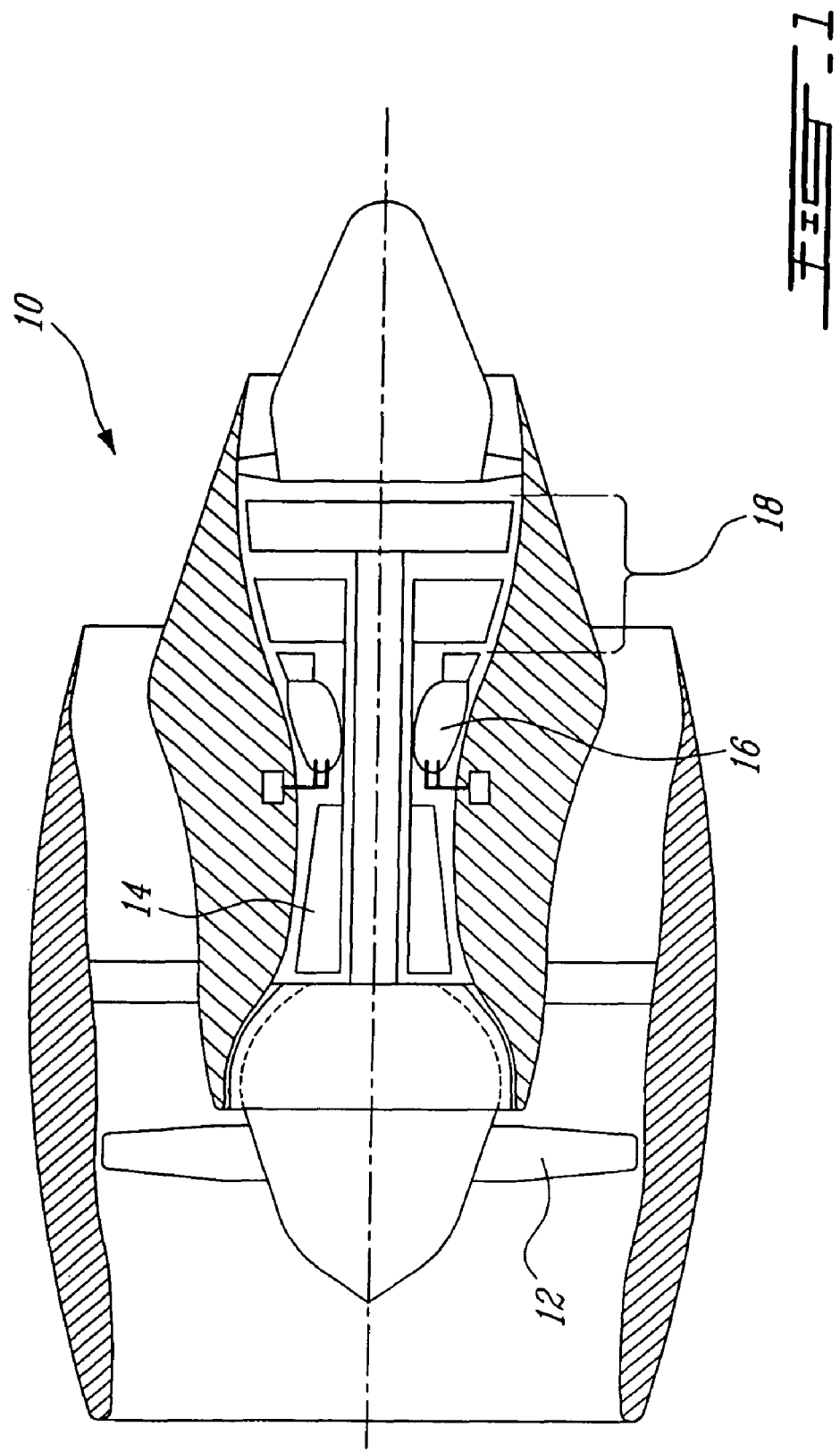
FIG. 1 is a schematic view of a gas turbine engine showing an example of a possible environment in which the turbine support case can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
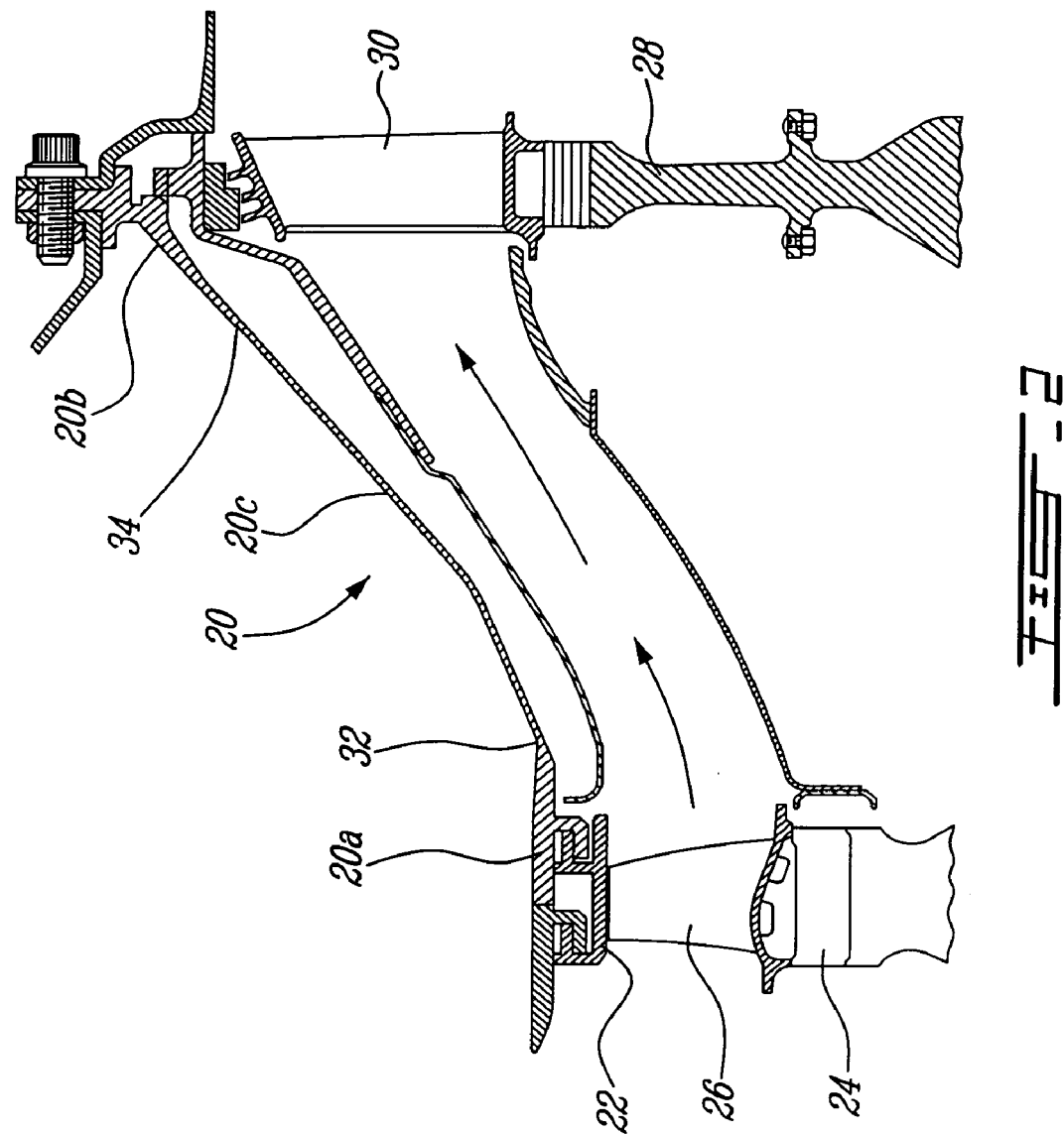
FIG. 2 is a semi-schematic partial cutaway view of the turbine section of a gas turbine engine showing an example of a turbine support case in accordance with a possible embodiment.

FIG. 2 shows an example of a turbine support case in accordance with a possible embodiment. The turbine support case 20, as its name indicates, is located in the turbine section of a gas turbine engine, for instance the turbine section 18 of the gas turbine engine 10 illustrated in FIG. 1. It comprises a first annular portion 20a that is positioned around the shroud 22 of the first turbine rotor 24. This turbine rotor 24 comprises a plurality of airfoils 26. In use, these airfoils 26 rotate at a very high speed within the space defined by the shroud 22.

The support case 20 of the illustrated embodiment extends between the first rotor 24 and a second rotor 28 located downstream the first rotor 24. This second rotor 28 also comprises a plurality of airfoils 30 rotating at a very high speed when the engine is operated. The support case 20 comprises a second annular portion 20b, by which the support case 20 is connected to the gas turbine engine. As the portion 20b is annular as shown in FIG. 2 there is a circular contact surface between the portion 20b and the casing of the gas turbine engine 10. Hot combustion gases coming out of the combustor, for instance the combustor 16 of the engine 10, flows to the turbine section 18 following a hot gas passage. The airfoils 26 supported by the first rotor 24 and the airfoils 30 by the second rotor 28 are configured and disposed to be within this hot gas passage to extract the energy therefrom.

To link the first portion 20a with the second portion 20b, there is provided a third annular portion 20c which is coaxially connected between the first portion 20a and the second portion 20b, with the resulting wall having a direction remaining between 0° and 90° with reference to the air flow direction. This third portion 20c has an average wall thickness smaller than the average wall thickness of the first portion 20a and the second portion 20b. It is possible to provide the third portion 20c with a thinner wall because of the smaller thermal and mechanical constraints at the intermediary region.

It is generally advantageous to make the first portion 20a, the second portion 20b or both using a forged material. Forged parts have a number of advantages but cannot be manufactured with a relatively thin wall. For instance, they cannot be manufactured with an average thickness being less than 70 mils. On the other hand, a metallic sheet material can be made thinner, for instance having an average thickness of 40 mils. This smaller wall thickness allows the support case 20 to be lighter than if only two larger and thicker parts are connected together.

In the past, support cases were made of an integrally-formed forged item or two forged portions welded together. This resulted in a turbine support case having a relatively large average wall thickness. In the support case 20 presented in FIG. 2, the third portion 20c has an average wall thickness smaller than the average wall thickness of the first portion 20a and the second portion 20b. This third portion 20c can be made of a metal sheet material, thus a material that may have a smaller average wall thickness than that of forged parts. The first portion 20a and the second portion 20b are then made shorter to accommodate the presence of the third portion 20c compared to prior designs.

The connection between the first portion 20a, the second portion 20b and the third portion 20c can be made in a number of ways. For instance, the first portion 20a can be welded to the third portion 20c, and the second portion 20b can be welded to an opposite end of the third portion 20c. The position of the weld lines 32, 34 is shown in FIG. 2. Although this figure shows the portions being connected together in a seamless way, it is possible to provide other kinds of connections, including the use of other mechanical fasteners such as bolts, rivets, etc.

The material cost is usually another factor to be considered in the design of a gas turbine engine component. Since the front section of the support case 20 is located in a hotter region of the engine, the designers would generally prefer to use a material having a relatively small thermal expansion coefficient. Examples of this kind of material, known as "low-alpha" materials, are nickel alloys such as Hastalloy, IN783, IN625 and X-750. Although the whole support case 20 can be made of IN783, or a similar material, this may be very costly due to the relatively high cost of the material. In the support case 20, on the other hand, thermal expansion in the regions of the second portion 20b and the third portion 20c are less of an issue, and these can be made of a material having a larger thermal expansion coefficient, thus a material being relatively less costly, such as IN718 or any material suitable for use with the selected low alpha material. The use of the low alpha material could then be limited to a smaller portion of the support case 20.

Overall, this new design reduces the weight of turbine support cases and also the manufacturing costs of the support cases since less material is used. Using an increased proportion of a relatively less costly material can further reduce the costs of the support case 20.

The above description is meant to be exemplary only, and one skilled in the art will recognize that changes may be made to the embodiments described without departing from the scope of the invention disclosed. For example, the shape of the various portions can be different than what is shown in FIG. 2. The same material can be used for all portions or a different material can be used for each portion. The average thickness of the third portion is not limited to be less than 70 mils and can be 70 mils or more, depending on the design. A list of materials can be used for making the support cases is not limited to what is disclosed herein. The third portion 20c can itself be made of two or more subparts connected together. Still other modifications which fall within the scope of the present invention will be apparent to those skilled in the art, in light of a review of this disclosure, and such modifications are intended to fall within the appended claims.

What is claimed is:

1. A turbine support case for use in a gas turbine engine, the support case comprising:
   a first annular portion cantilevered with respect to the gas turbine engine;
   a second annular portion axially downstream of the first portion relative to a direction of airflow through the engine, the second portion having a downstream end at which the support case is attached to the gas turbine engine; and
   a third annular portion provided axially between a downstream end of the first portion and an upstream end of the second portion, the third portion connecting the first portion to the second portion such that the turbine support case is defined by sequentially the first annular portion, the third annular portion and the second annular portion along an air flow direction, with the first annular portion cantilevered through the third annular portion and the second annular portion, the third portion having an average wall thickness smaller than an average wall thickness of the first portion or the second portion to provide the support case;
   the support case having an internal surface facing toward a rotor of gas turbine engine, and an external surface facing away from the rotor of the gas turbine engine, with the first annular portion, the second annular portion and the third annular portion each being made of a single layer of material between the internal surface and the external surface wherein the third portion is made of a material having a larger thermal expansion coefficient than that of at least one among the first portion and the second portion.

2. The support case as defined in claim 1, wherein at least one among the first portion and the second portion is made of a forged material.

3. The support case as defined in claim 2, wherein the average wall thickness of the third portion is less than 70 mils.

4. The support case as defined in claim 3, wherein the third portion is made of a metal sheet material.

5. A turbine support case for use in a gas turbine engine, the support case comprising:
   a first annular portion having an average wall thickness of at least 70 mils;
   a second annular portion axially downstream of the first portion relative to a direction of airflow through the engine, the second portion having an average wall thickness of at least 70 mils;
   a third annular portion axially downstream of the first portion and axially upstream the second portion, the third portion having an average wall thickness less than 70 mils;
   the third portion connecting the first portion and the second portion such that the turbine support case is defined by sequentially the first annular portion, the third annular portion and the second annular portion along an air flow direction, the third portion being made of a material having a larger thermal expansion coefficient than that of at least one among the first portion and the second portion, with the support case having an internal surface facing toward a rotor of gas turbine engine, and an external surface facing away from the rotor of the gas turbine engine, with the first annular portion, the second annular portion and the third annular portion each being made of a single layer of material between the internal surface and the external surface wherein the third portion is made of a material having a larger thermal expansion coefficient than that of both the first portion and the second portion.

6. The support case as defined in claim 5, wherein at least one among the first portion and the second portion is made of a forged material.

7. The support case as defined in claim 6, wherein the third portion is made of a metal sheet material.

8. The support case as defined in claim 5, wherein the third portion has a substantially conical shape.

9. The support case as defined in claim 5, wherein the first portion and the third portion are welded together at corresponding mating ends.

10. The support case as defined in claim 9, wherein the second portion and the third portion are welded together at corresponding mating ends.

11. The support case as defined in claim 10, wherein the second portion has a downstream end providing a circular attachment point to attach the support case to the gas turbine engine while the first and third portions are devoid of direct attachment point with the gas turbine engine.

12. The support case as defined in claim 11, wherein the first portion has an upstream end that is a free end and the support case has a wall extending uninterruptedly between the free end of the first portion and the attachment point on the second portion in a direction that remains between 0 and 90° with reference to the air flow direction within the support case.

* * * * *